(12) United States Patent
Thorne (10) Patent No.: US 9,201,164 B2
(45) Date of Patent: Dec. 1, 2015

(54) SYSTEM AND METHOD OF USING SPATIALLY INDEPENDENT SUBSETS OF DATA TO CALCULATE PROPERTY DISTRIBUTION UNCERTAINTY OF SPATIALLY CORRELATED RESERVOIR DATA

(75) Inventor: Julian Thorne, Orange, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 811 days.

(21) Appl. No.: 13/297,092

(22) Filed: Nov. 15, 2011

(65) Prior Publication Data
US 2013/0124097 A1 May 16, 2013

(51) Int. Cl.
*E21B 49/00* (2006.01)
*G01V 99/00* (2009.01)
*G06F 17/40* (2006.01)
*G06F 19/00* (2011.01)

(52) U.S. Cl.
CPC ............ *G01V 99/005* (2013.01); *E21B 49/00* (2013.01); *G06F 17/40* (2013.01); *G06F 19/00* (2013.01)

(58) Field of Classification Search
CPC ......... E21B 41/00; E21B 47/00; E21B 49/00; G01D 1/00; G01D 7/00; G01D 9/00; G01D 21/00; G01V 1/00; G01V 1/28; G01V 1/30; G01V 1/306; G01V 1/40; G01V 9/00; G01V 99/00; G01V 99/005; G06F 11/00; G06F 11/30; G06F 11/32; G06F 11/34; G06F 15/00; G06F 15/16; G06F 17/00; G06F 17/10; G06F 17/16; G06F 17/18; G06F 17/40; G06F 19/00

USPC ........ 73/152.01, 152.02, 432.1, 865.8, 865.9, 73/866.3; 166/244.1, 250.01; 175/40, 50; 181/101; 250/253; 324/323; 367/14; 702/1, 2, 6, 11, 12, 13, 127, 182, 187, 702/189; 708/100, 105, 200
See application file for complete search history.

(56) References Cited

U.S. PATENT DOCUMENTS 7,389,201 B2 * 6/2008 Chickering et al. .......... 702/181
8,214,157 B2 * 7/2012 Moser et al. .................... 702/19
(Continued)

OTHER PUBLICATIONS

Spatial bootstrap methods of Journal (A.G. Journal, "Resampling from stochastic simulations," Environmental and Ecological Statistics, 1994, p. 63-91.
(Continued)

*Primary Examiner* — Edward Cosimano
(74) *Attorney, Agent, or Firm* — Albert K. Shung (57) ABSTRACT

A system and a method, implemented on a computer, for calculating property distribution uncertainty of spatially correlated petrophysical data. The method includes inputting, into the computer, a sample petrophysical data comprising correlated data; applying, using the computer, a variogram to the sample petrophysical data to select a plurality of subsets of data, the subsets of data being substantially less correlated than the sample petrophysical data; and applying, using the computer, a bootstrap process on each of the plurality of subsets of data to obtain a plurality of bootstrap data sets from each of the plurality of subsets of data. The method further includes calculating data distributions for each of the obtained plurality of bootstrap data sets; ranking the data distributions by using a selected statistical parameter to obtain ranked data distributions; and characterizing the uncertainty based on the ranked data distributions.

22 Claims, 4 Drawing Sheets

(56) References Cited

U.S. PATENT DOCUMENTS

| | | | |
|---|---|---|---|
| 9,146,903 | * | 9/2015 | Thorne .................. G06F 17/18 |
| 2002/0184139 A1* | | 12/2002 | Chickering et al. ............ 705/38 |
| 2005/0096893 A1 | | 5/2005 | Feraille et al. |
| 2008/0162093 A1 | | 7/2008 | Nivlet et al. |
| 2009/0043555 A1 | | 2/2009 | Busby et al. |
| 2009/0091573 A1 | | 4/2009 | Shi et al. |
| 2009/0307248 A1* | | 12/2009 | Moser et al. .................. 707/101 |
| 2010/0299126 A1 | | 11/2010 | Chugunov et al. |
| 2013/0124092 A1* | | 5/2013 | Thorne .............................. 702/6 |
| 2013/0124522 A1* | | 5/2013 | Moser et al. .................. 707/737 |
| 2013/0317779 A1* | | 11/2013 | Thorne ......................... 702/180 |
| 2014/0040265 A1* | | 2/2014 | Moser et al. .................. 707/737 |

OTHER PUBLICATIONS

Xu, Wenlong and Journel, Andre G., Histogram and Scattergram Smoothing Using Convex Quadratic Programming, International Association for Mathematical Geology, 1995, p. 83-103.

PCT Notification of Transmittal of the International Search Report and the Written Opinion of the International Searching Authority or the Declaration regarding PCT/US2012/060387, dated Mar. 29, 2013 (8 pages).

* cited by examiner

SYSTEM AND METHOD OF USING SPATIALLY INDEPENDENT SUBSETS OF DATA TO CALCULATE PROPERTY DISTRIBUTION UNCERTAINTY OF SPATIALLY CORRELATED RESERVOIR DATA

CROSS-REFERENCE TO RELATED APPLICATIONS

The present invention is related to pending U.S. patent application Ser. No. 13/678,218 entitled "SYSTEM AND METHOD OF USING SPATIALLY INDEPENDENT SUBSETS OF DATA TO DETERMINE THE UNCERTAINTY OF SOFT-DATA DEBIASING OF PROPERTY DISTRIBUTIONS FOR SPATIALLY CORRELATED RESERVOIR DATA" and pending U.S. patent application Ser. No. 13/297,070 entitled "SYSTEM AND METHOD OF USING SPATIALLY INDEPENDENT SUBSETS OF DATA TO CALCULATE VERTICAL TREND CURVE UNCERTAINTY OF SPATIALLY CORRELATED RESERVOIR DATA", both of which are filed concurrently with the present patent application and the entire contents of each is herein incorporated by reference.

FIELD

The present invention relates generally to statistical analysis of petrophysical data or more specifically to a system and a method of using spatially independent subsets of data to calculate property distribution uncertainty of spatially correlated reservoir data.

BACKGROUND

Reservoir properties are sampled at well logs (wireline, LWD or cased-hole logs). Proper characterization of a reservoir, particularly for estimates of net rock volume, porosity volume, and original oil in place, requires an estimate of the property distributions of shale volume, porosity, saturation, etc. and the uncertainty of these property distributions. Property distribution uncertainty is a key component of reservoir characterization that affects volumetric uncertainty and reservoir recovery forecasts.

Typically a reservoir modeler will have no way to derive accurate distribution uncertainty for his model. Conventional statistical techniques of bootstrap are often used to assess the uncertainty of population statistics or property distribution (for example, as implemented in application Crystal Ball, developed by Oracle Corporation.

However, conventional bootstrap methods assume incorrectly that each property data collected is an independent measurement. Spatial bootstrap methods of Journel (A. G. Journel, "Resampling from stochastic simulations," Environmental and Ecological Statistics, 1994, p. 63-91.) do not assume data independence. However, these methods are used solely to determine the uncertainty of the mean of the property distribution. These methods are not used to determine the uncertainty of the distribution itself.

Therefore, there is a need for a method of determining uncertainty of a property distribution such as, but not limited to, property distribution of shale volume, porosity, saturation, etc.

SUMMARY

In accordance with some aspects of the disclosure is provided, a method, implemented on a computer, for calculating property distribution uncertainty of spatially correlated petrophysical data. The method includes inputting, into the computer, a sample petrophysical data comprising correlated data; applying, using the computer, a variogram to the sample petrophysical data to select a plurality of subsets of data, the subsets of data being substantially less correlated than the sample petrophysical data; applying, using the computer, a bootstrap process on each of the plurality of subsets of data to obtain a plurality of bootstrap data sets from each of the plurality of subsets of data; calculating data distributions for each of the obtained plurality of bootstrap data sets; ranking the data distributions by using a selected statistical parameter to obtain ranked data distributions; and characterizing the uncertainty based on the ranked data distributions.

In accordance with other aspects of the disclosure is provided a computer system for calculating property distribution uncertainty of spatially correlated petrophysical data. The computer system includes a storage device configured to store a sample petrophysical data comprising correlated data, and a processor configured to output a graphical user interface, the graphical user interface having a plurality of fields for inputting parameters including a variogram. The processor is configured to: apply the variogram to the sample petrophysical data to select a plurality of subsets of data, the subsets of data being substantially less correlated than the sample petrophysical data; apply a bootstrap process on each of the plurality of subsets of data to obtain a plurality of bootstrap data sets from each of the plurality of subsets of data; calculate data distributions for each of the obtained plurality of bootstrap data sets; rank the data distributions by using a selected statistical parameter to obtain ranked data distributions; and characterize the uncertainty based on the ranked data distributions.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

According to an aspect of the present disclosure, it is provided a method of estimating property distribution uncertainty, that is, the uncertainty associated with a histogram and cumulative distribution function of reservoir properties such as shale volume, porosity, saturation etc. . . . in a reservoir volume of interest.

Figure 1:
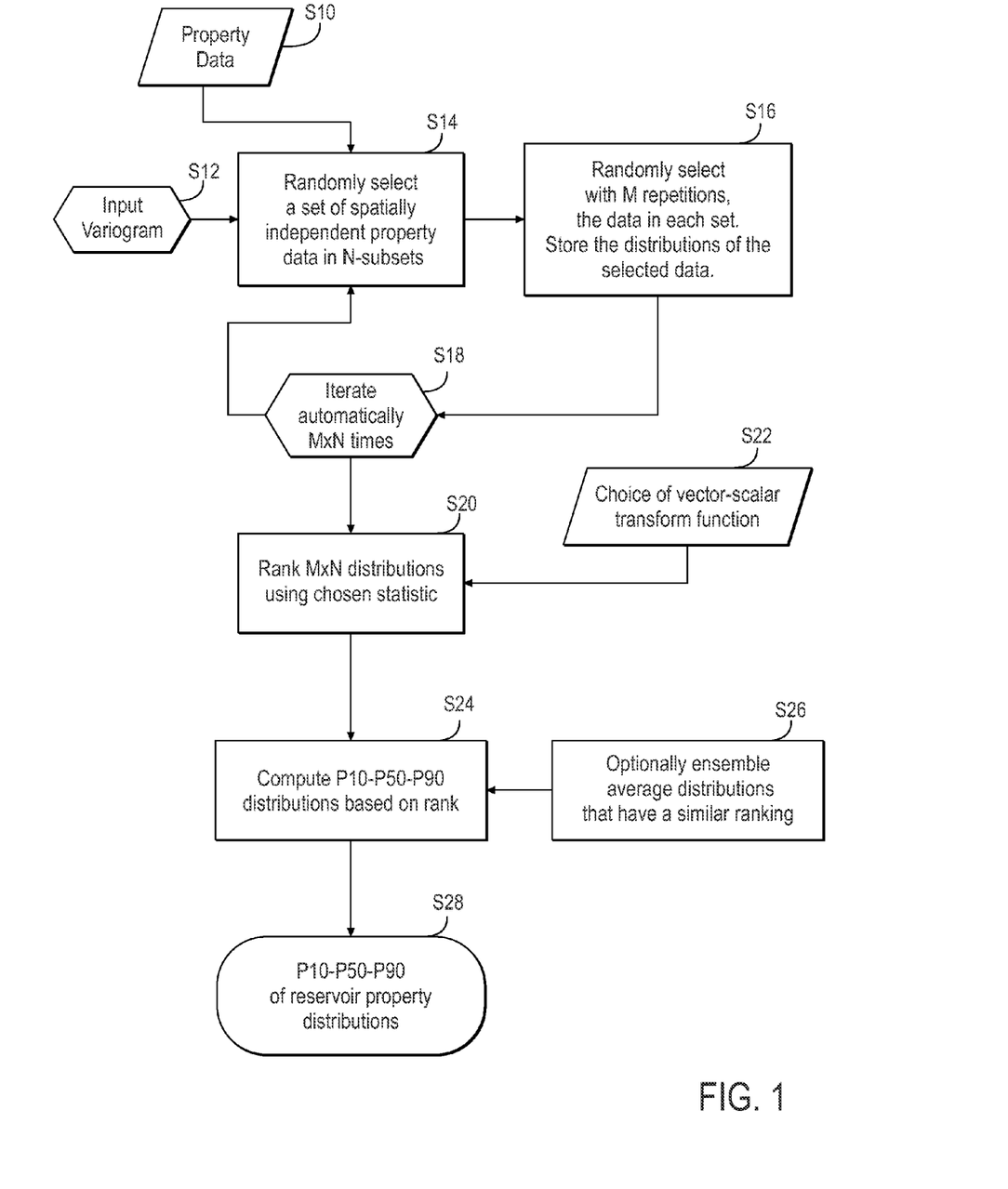
FIG. 1 is flow chart of a method of determining the uncertainty of a reservoir property distribution or petrophysical sample data, according to an embodiment of the present invention.

FIG. 1 is flow chart of a method of determining the uncertainty of a reservoir property distribution or petrophysical sample data, according to an embodiment of the present invention. The method determines the uncertainty of a rock or reservoir property data without requiring that the sample property data are independent, the sample data comprising correlated data. The method includes inputting the sample rock property data, at S10.

In one embodiment, the sample data includes, for example, cased hole samples or already assigned samples in a grid. For example, there are situations where only a partial sampling of a population is available as there is a limited number of boreholes or a limited number of cores (e.g., extracted from the boreholes). As a result, the data collected from the samples may be correlated. As a result, uncertainty exits because the available partial sample is only a small portion of a larger volume of rock to be characterized (e.g., in an entire region) and the data within the collected sample is correlated, i.e., dependent. Even if the number of samples may be relatively large, because samples are collected from locations that are near each other, the large number of samples may be dependent and also may not be representative of the larger volume to be characterized.

In order to select a set of independent data from a sample population containing dependent or correlated data, a variogram is used. The method includes inputting a variogram, at S12. A variogram in a two-dimensional space is generally noted $2\gamma(\delta x, \delta y)$, where $2\gamma(\delta x, \delta y)$ is called the semi-variogram. The variogram is a function describing the degree of spatial dependence as a function of separation $(\delta x, \delta y)$ between two points of a spatial random field or stochastic process $Z(x,y)$. The variogram is used, at S14, to create N subsets of property data that are substantially spatially less correlated than the initial set of correlated sample data so as to apply a bootstrap process. N subsets (where N is greater than 2) are needed so as to achieve a statistically meaningful result.

A variogram can be generated from many sources. For example, a variogram can be generated by analyzing the original sample data (e.g., the sample core data) and analyzing the correlation of the sample data as a function of distance $(\delta x, \delta y)$. The variogram can also be generated from conceptual models. In the present case, however, the variogram is generated by analyzing the original sample data correlation with distance. However, as it can be appreciated other methods for generating a variogram can also be used. For example, when the sample data are relatively close they are considered to be dependent but as distance increases the dependency or correlation in the sample data decreases. In other words, the distance is scaled by a variogram. Variogram distance in one direction may not be equivalent to variogram distance in another direction. In this respect, variograms are ellipsoids in that the variation of the variogram along the east-west direction is different from the variation of the variogram along the north-south direction.

Variograms have a gamma value also called covariance. The gamma value varies from zero to one, when using normal scores. When using a normal score transform such as, for example, the standard deviation, the gamma value is equal to one when normalized by the standard deviation. Hence, it is generally assumed that if gamma values are greater than one then the sample data is considered to be independent. On the other hand, if gamma values are less than one then the sample data is dependent or correlated. The closer the gamma value to zero, the more the sample data is dependent or correlated.

The gamma value threshold can be selected by a user according to the sample data. If the sample data is highly correlated, for example, then selecting a gamma value threshold greater than one would eliminate a great number of data points which would render a bootstrap process on the sample data not useful. On the other hand selecting a gamma value threshold close to zero would leave most the correlated sample data which would also render a bootstrap operation on correlated sample data less useful. Therefore, the gamma value threshold is selected to achieve a compromise so as not to filter out most of the sample data but at the same time select sample data that is not highly correlated so as to obtain a meaningful bootstrap result. Therefore, the gamma value can be selected from the range between zero and approximately one. However, in order to achieve a good compromise, a gamma value between about 0.3 to about 1 can be selected. In the present example, a gamma value of approximately 0.5 is selected as the threshold. Hence, sample data that have a gamma value of less than approximately 0.5 is filtered out while sample data having a gamma value greater than approximately 0.5 (e.g., between approximately 0.5 and 1.0) is used.

After defining the N subset of substantially spatially less correlated or independent property data using the variogram, at S12, the method randomly selects one set of spatially independent property data, at S14. A bootstrap process can be applied to each of the N subsets of spatially independent data, at S16.

A bootstrap is a name generically applied to statistical resampling schemes that allow uncertainty in the data to be assessed from the data themselves. Bootstrap is generally useful for estimating the distribution of a statistical parameter (e.g., mean, variance) without using normal theory (e.g. z-statistic, t-statistic). Bootstrap can be used when there is no analytical form or normal theory to help estimate the distribution of the statistics of interest because the bootstrap method can apply to most random quantities, for example, the ratio of variance and mean. There are various methods of performing a bootstrap such as by using case resampling including resampling with the Monte Carlo algorithm, parametric bootstrap, resampling residuals, Gaussian process regression bootstrap, etc.

In a resampling approach, for example, given n independent observations $z_i$, where $i=1, \ldots, n$ and a calculated statistical parameter S, for example the mean, the uncertainty in the calculated statistical parameter S (e.g., mean) can be determined using a resampling bootstrap approach. In this case, $n_b$ values of $z_{bj}$, $j=1, \ldots, n_b$ (where $n_b$ is the number of bootstrap values which is equal to the given number n of independent observations) are drawn from the original data with replacement to obtain a bootstrap resample. A bootstrap statistic $S_b$ (e.g., new mean) is then calculated from the bootstrap resample. This procedure is repeated a plurality of times (M times) to build a distribution of uncertainty in S (e.g., mean).

Returning to the present method, the method randomly selects with repetition (M times) the data in each of the N subsets, at S16. In other words, M bootstrap sets are drawn for each subset in the N subsets of spatially independent property data. Hence, M bootstraps are performed on the N subsets of the property data in which the samples of the subsets property data are substantially less spatially dependent than the original sample data. The method includes iterating the bootstrap process M×N times, at S18, until all data in each of the N subsets is processed.

The method further includes calculating data distributions for each of the M×N datasets, and storing the distributions as M×N model vectors and ranking the M×N model vectors or distributions using a selected statistic or statistical parameter, at S20.

There are various procedures for ranking the M×N distributions or vectors. For example, the vectors can be ranked by using a vector-scalar transform function. Therefore, the method includes inputting a selected vector-scalar transform function, at S22. The vector-scalar function takes a vector as an input and outputs a scalar value of the vector. Examples of vector-scalar transforms include calculating the P10 of the distribution, the P50 of the distribution, the P90 of the distribution, the mean of the distribution, or the standard deviation of the distribution, etc. or any combination of two or more thereof. Applying the vector-scalar transform on the distributions to obtain a scalar value for each distribution. By using the obtained scalar value from the vector-scalar transform, the distributions or vectors can be sorted into a list of scalar values each of which is associated with the distribution from which it was calculated. The scalar values are then ranked, for example, in ascending or descending order.

For example, if the vector-scalar transform is the mean function, then the distributions can be ranked from low mean to high mean. The mean of the distribution reflects the volume of a reservoir. The reservoir depends on the mean of the components that go into oil in place. Oil in place is a multiplication of various properties. Standard deviation is another vector-scalar transform that is also useful in evaluating the volume of recoverable reservoir. For example, when oil and water flow through a rock formation, the standard deviation of rock formation porosity and permeability indicates a spread of the variability that creates heterogeneity in the rock formation and consequently may lower the recovery factor.

The M×N distributions correspond to cumulative distribution functions (CDFs). The CDFs is an ensemble of numbers. In order to identify which of the numbers is 10th, 50th or 90th percentile values from the sorted list, the CDFs are ranked. For example, if the mean value is chosen as a statistic or statistical parameter, the CDFs with the P10, P50 and P90 means are computed based on the rank, at S24. Hence, the uncertainty can be characterized based on the ranked data distributions. Optionally, an ensemble average distribution is applied to distributions that have a similar ranking, or that are ranked within a desired range or ensemble averaging percentage (EAP), at S26. For example, an ensemble average of several or a portion of the distributions all of which rank near P10 (e.g., within an EAP of 5%) can be used instead of just the single distribution that falls exactly at P10. Similarly, an ensemble average of several distributions all of which rank near P50 (e.g., within an EAP of 5%) can be used instead of just the single distribution that falls exactly at P50. Similarly, an ensemble average of several distributions all of which rank near P90 can be used instead of just the single distribution that falls exactly at P90 (e.g., within an EAP of 5%). Once the CDFs are ranked P10, P50 and P90, rather than choosing a single distribution that happen to be ranked at P10, and outputting that, ensemble averaging is performed on the distribution that rank right around the P10, for example. Ensemble averaging creates a smoother result. The method then outputs a P10, P50 and P90 reservoir property distributions, at S28. Reservoir property distributions P10, P50, P90 are used as input constraints to geostatistical property modeling. The P10, P50 and P90 reservoir property distributions can be used to build three different model scenarios to capture property uncertainty.

Figure 2A:
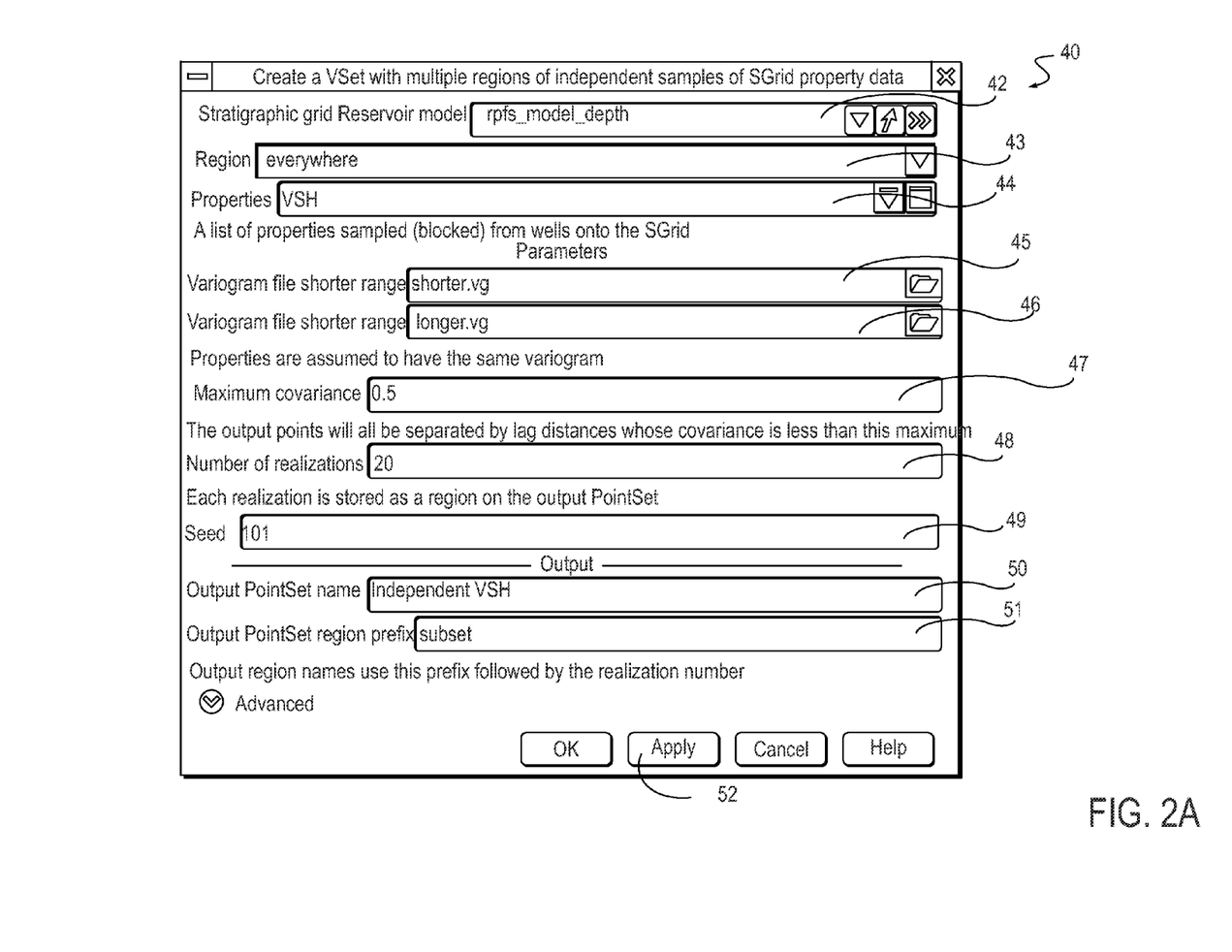
FIG. 2A shows a graphical user interface (GUI) for creating data subsets of independent sample of property, according to an embodiment of the present invention.
Figure 2B:
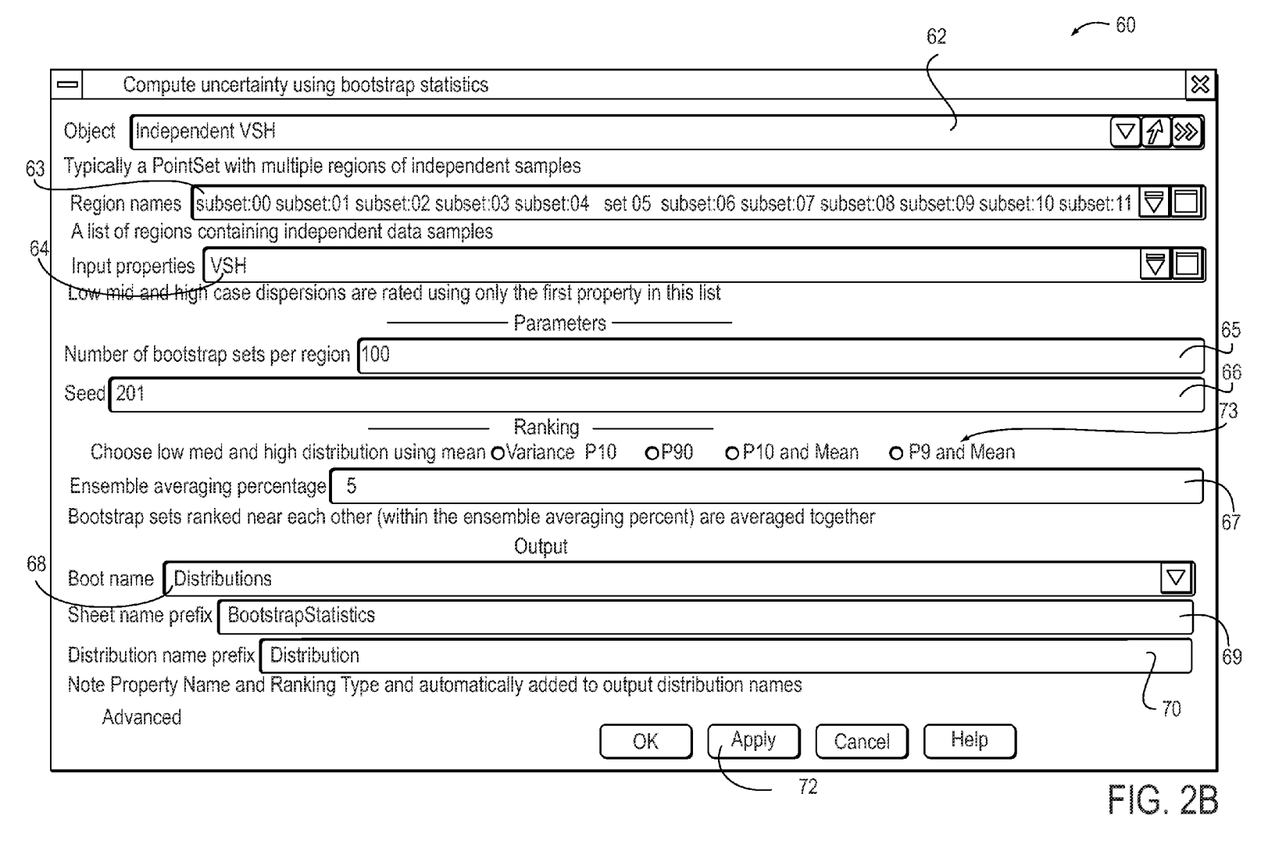
FIG. 2B shows a graphical user interface (GUI) for computing property distributions and uncertainty using a bootstrap process, according to an embodiment of the present invention.

FIGS. 2A and 2B shows graphical interfaces of a program for implementing the method of FIG. 1, according to an embodiment of the present invention. FIG. 2A shows the graphical user interface (GUI) 40 for creating data subsets of independent sample of property, according to an embodiment of the present invention. In this case the sample property is on a grid instead of wells. However, as it can be appreciated any sample property can be used including samples obtained from wells or boreholes. FIG. 2B shows a graphical user interface (GUI) 60 for computing property distributions and uncertainty using a bootstrap process, according to an embodiment of the present invention. Although these two procedures are shown implemented with two distinct graphical interfaces, a single graphical interface can also be provided that can implement both procedures.

The GUI 40 shown in FIG. 2A includes field 42 for selecting a stratigraphic grid point set reservoir model. The GUI 40 also includes field 43 for specifying a region in the grid point set for further sampling. For example, "everywhere" is shown to be selected so as to use the whole grid point set. The GUI 40 further includes field 44 for specifying the properties of the data set. In this case, V-shale data is selected. However any other type of property data can be selected. The GUI 40 also includes fields 45 and 46 for inputting a variogram. Field 45 is for inputting a shorter range variogram. Field 46 is for inputting a longer range variogram. If the variogram itself is not subject to uncertainty then the same variogram can be used for both fields 45 and 46. GUI 40 also includes field 47 for inputting a gamma value or covariance. As stated above any gamma value between 0 and 1 can be selected. However, in the present case, a gamma value threshold is selected to be equal to 0.5. GUI 40 further includes field 48 for inputting a number of realizations (e.g., 20). The number of realizations is the number of independent subsets that are produced. The number of realization correspond to the number M in the M×N sets. GUI 40 further includes field 49 for inputting a seed number for the random number generator used by the program. GUI 40 further includes field 50 for specifying a name for an output result file or point set name, for example, "independent VSH." GUI 40 further includes field 51 for specifying an output point set region prefix such as "subset." The output region names uses the prefix followed by the realization number, e.g., subset01, subset02, ... subset20. The GUI includes button "Apply" 52 to apply a procedure for creating data subsets of independent sample of property.

The GUI 60 shown in FIG. 2B includes field 62 for selecting input point set file with multiple regions of independent samples which corresponds to the file name in field 50 of GUI 40 output by applying the procedure of creating data subsets of independent sample property. The GUI 60 also includes field 63 for specifying a list of regions each containing independent data samples corresponding to the regions with the names specified at 51 in GUI 40. GUI 60 further includes field 64 for specifying the type of data reservoir properties such as VSH corresponding to V-shale. If the properties are highly correlated the properties are selected together but low, mid, and high case distributions are ranked using only the first property in the list. GUI 60 further includes field 65 for specifying how many bootstrap runs (corresponding to number M in the above paragraphs) are implemented for each subset in the N-subsets (e.g., 20 subsets). In this case the M-number is 100, but any number can be selected for the number of bootstrap runs. GUI 60 further includes field 66 which specifies a seed number, e.g., 201. A seed number is used because bootstrapping is a random process. GUI 60 also includes field 67 for inputting an ensemble averaging percentage (EAP), e.g., 5%, such that bootstrap sets ranked near each other within the specified EAP (e.g., 5%) are averaged together. Therefore, as it can be appreciated, increasing the EAP value leads to more smoothed output distributions. GUI 60 also includes fields 73 for selecting the ranking type. The type of ranking can be selected depending upon what is thought to be a key factor effecting reservoir economics. For example, mean can be selected for volumetric uncertainty in high natural gas NTG fields, variance can be selected for heterogeneity uncertainty, P10 or P90 can be selected for thief zones or barriers, P10 and mean or P90 and mean can be used for volumetric uncertainty in low NTG fields. GUI 60 also includes field 68 for specifying an output file name such "distribution", field name 69 for specifying sheet prefix name such as "bootstrap_statistics", and field name 70 for specifying distribution name prefix such as "distribution." GUI 60 further includes button "Apply" 72 to apply and compute the uncertainty with bootstrap statistics using the input parameters.

Figure 3:
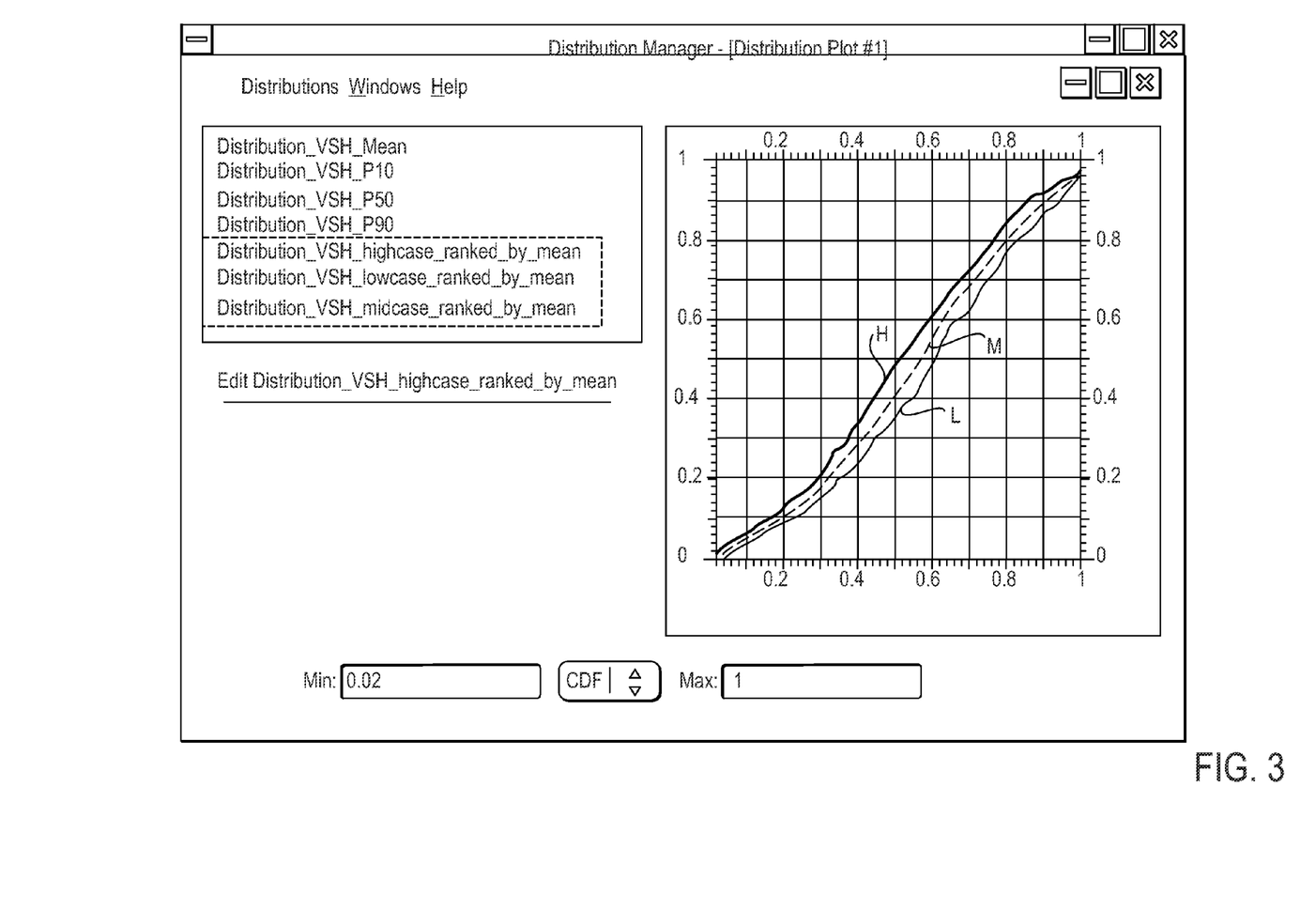
FIG. 3 is plot of the results of distributions for Vshale ranked by mean, according to an embodiment of the present invention.

FIG. 3 is plot of the results of the distributions CDFs for a V-shale ranked by mean, according to an embodiment of the present invention. The horizontal axis (X-axis) corresponds to the cumulative probability and the vertical axis (Y-axis) corresponds to the value of the distribution. Therefore, as shown in FIG. 3, the value of the distribution is plotted as a function of cumulative probability for a high case 'H', a mid case 'M' and a low case 'L'. For example, for the median of the distribution where the cumulative probability is equal to approximately 0.5, a vertical line intersects the L curve at a value of 0.35, intersects the M curve at a value of 0.4, and intersects the H curve at a value of 0.45. Therefore, the L curve has a lower mean than the M curve which has a lower mean than L curve. The L, M and H reservoir property distributions can be used to build three different model scenarios to capture property uncertainty.

In some embodiments, programs for performing methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) can be designed to implement the method or methods of the present invention.

Although the various steps of the method are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method, implemented on a computer, for calculating property distribution uncertainty of spatially correlated petrophysical data, comprising:
    inputting, into the computer, a sample petrophysical data comprising correlated data from a reservoir volume of interest;
    applying, using the computer, a variogram to the sample petrophysical data to select a plurality of subsets of data, the subsets of data being substantially less correlated than the sample petrophysical data;
    applying, using the computer, a bootstrap process on each of the plurality of subsets of data to obtain a plurality of bootstrap data sets from each of the plurality of subsets of data;
    calculating data distributions for each of the obtained plurality of bootstrap data sets;
    ranking the data distributions by using a selected statistical parameter to obtain ranked data distributions;
    determining a property distribution uncertainty based on the ranked data distributions; and
    using the property distribution uncertainty to characterize the reservoir volume of interest and estimate one or more properties of the reservoir volume of interest, the properties comprising at least one of porosity volume, original oil in place, net rock volume, or combinations thereof.

2. The method according to claim 1, wherein characterizing the uncertainty based on the ranked data distributions comprises calculating a P10, a P50, or a P90, or any combination of two or more thereof, of the ranked data distributions.

3. The method according to claim 1, wherein applying the bootstrap process comprises applying a resampling bootstrap process on each of the plurality of subsets of data.

4. The method according to claim 3, wherein applying the resampling process comprises resampling with a Monte Carlo algorithm each of the plurality of subsets of data.

5. The method according to claim 1, wherein applying the variogram comprises selecting a gamma value of the variogram according to the sample petrophysical data.

6. The method according to claim 5, wherein selecting the gamma value comprises selecting a gamma value in a range between 0.3 and 1.

7. The method according to claim 6, wherein selecting the gamma value comprises selecting a gamma value greater than 0.5.

8. The method according to claim 1, wherein ranking the data distributions by using the selected statistical parameter comprises applying a vector-scalar transform to the data distributions to obtain scalar values, each scalar value being associated with a distribution, and ranking the data distributions according to the obtained scalar values.

9. The method according to claim 8, wherein applying the vector-scalar transform comprises applying a mean function or a standard deviation function.

10. The method according to claim 9, further comprising applying an ensemble averaging to a portion of the distributions that are ranked within a desired ranking ensemble averaging percentage.

11. The method according to claim 9, further comprising applying an ensemble averaging to a first portion of the distributions that are ranked within a first selected range of a 10 percentile, applying an ensemble averaging to a second portion of the distributions that are ranked within a second selected range of a 50 percentile, and applying an ensemble averaging to a third portion of the distributions that are ranked within a third selected range of a 90 percentile.

12. A non-transitory computer readable medium having instructions stored thereon when executed by a computer performs a method comprising:
applying, using the computer, a variogram to the sample petrophysical data to select a plurality of subsets of data, the subsets of data being substantially less correlated than the sample petrophysical data;
applying, using the computer, a bootstrap process on each of the plurality of subsets of data to obtain a plurality of bootstrap data sets from each of the plurality of subsets of data;
calculating data distributions for each of the obtained plurality of bootstrap data sets;
ranking the data distributions by using a selected statistical parameter to obtain ranked data distributions;
determining a property distribution uncertainty based on the ranked data distributions; and
using the property distribution uncertainty to characterize the reservoir volume of interest and estimate one or more properties of the reservoir volume of interest, the properties comprising at least one of porosity volume, original oil in place, net rock volume, or combinations thereof.

13. A computer system for calculating property distribution uncertainty of spatially correlated petrophysical data, comprising:
a storage device configured to store a sample petrophysical data comprising correlated data from a reservoir volume of interest;
a processor configured to output a graphical user interface, the graphical user interface comprising a plurality of fields for inputting parameters including a variogram, wherein the processor is configured to:
apply the variogram to the sample petrophysical data to select a plurality of subsets of data, the subsets of data being substantially less correlated than the sample petrophysical data;
apply a bootstrap process on each of the plurality of subsets of data to obtain a plurality of bootstrap data sets from each of the plurality of subsets of data;
calculate data distributions for each of the obtained plurality of bootstrap data sets;
rank the data distributions by using a selected statistical parameter to obtain ranked data distributions;
characterize a property distribution uncertainty based on the ranked data distributions; and
use the property distribution uncertainty to characterize the reservoir volume of interest and estimate one or more properties of the reservoir volume of interest, the properties comprising at least one of porosity volume, original oil in place, net rock volume, or combinations thereof.

14. The computer system according to claim 13, wherein the processor is configured to apply a resampling bootstrap process on each of the plurality of subsets of data.

15. The computer system according to claim 13, wherein the processor is configured to characterize the uncertainty by calculating a P10, a P50, or a P90, or any combination of two or more thereof, of the ranked data distributions.

16. The computer system according to claim 13, wherein the graphical user interface comprises a plurality of fields for inputting parameters including a variogram gamma value.

17. The computer system according to claim 16, wherein the gamma value is in a range between 0.3 and 1.

18. The computer system according to claim 13, wherein the processor is configured to apply a vector-scalar transform to the data distributions to obtain scalar values, each scalar value being associated with a data distribution, and rank the data distributions according to the obtained scalar values.

19. The computer system according to claim 18, wherein the vector-scalar transform comprises a mean function or a standard deviation function.

20. The computer system according to claim 13, wherein the graphical user interface comprises a plurality of fields for inputting parameters including a number of the plurality of subsets.

21. The computer system according to claim 20, wherein the graphical user interface comprises a plurality of fields for inputting parameters including a number of bootstrap runs that are implemented for each subset in the number of the plurality of subsets to obtain the plurality of bootstrap data sets.

22. The computer system according to claim 21, wherein the graphical user interface comprises a plurality of fields for inputting parameters including an ensemble averaging percentage such that bootstrap data sets in the plurality of bootstrap data sets that are ranked near each other within the specified ensemble averaging percentage are averaged together.

* * * * *